(12) United States Patent
Lei (10) Patent No.: US 12,489,562 B2
(45) Date of Patent: Dec. 2, 2025

(54) METHOD AND APPARATUS FOR HARQ-ACK FEEDBACK TRANSMISSION

(71) Applicant: LENOVO (BEIJING) LIMITED, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 389 days.

(21) Appl. No.: 18/017,497

(22) PCT Filed: Jul. 22, 2020

(86) PCT No.: PCT/CN2020/103456
§ 371 (c)(1),
(2) Date: Jan. 23, 2023

(87) PCT Pub. No.: WO2022/016411
PCT Pub. Date: Jan. 27, 2022

(65) Prior Publication Data
US 2023/0361924 A1    Nov. 9, 2023

(51) Int. Cl.
*H04L 1/1607* (2023.01)
*H04L 1/1812* (2023.01)
*H04L 5/00* (2006.01)

(52) U.S. Cl.
CPC .......... *H04L 1/1664* (2013.01); *H04L 1/1671* (2013.01); *H04L 1/1812* (2013.01); *H04L 5/0055* (2013.01)

(58) Field of Classification Search
CPC .... H04B 7/04013; H04B 7/15; H04B 7/0617; H04B 7/15528

(Continued)

(56) References Cited

U.S. PATENT DOCUMENTS

2016/0295561 A1* 10/2016 Papasakellariou .... H04W 72/23
2018/0310257 A1* 10/2018 Papasakellariou .. H04W 52/242
(Continued)

FOREIGN PATENT DOCUMENTS

CN    111431681 A    7/2020
CN    111435867 A    7/2020

OTHER PUBLICATIONS

International Searching Authority, "Written Opinion of the International Searching Authority," PCT/CN2020/103456, Apr. 7, 2021, pp. 1-4.

(Continued)

*Primary Examiner* — Mang Hang Yeung
(74) *Attorney, Agent, or Firm* — Kunzler Bean & Adamson (57) ABSTRACT

Embodiments of the present disclosure relate to methods and apparatuses. According to some embodiments of the disclosure, a method for wireless communications performed by a UE may include: receiving, from a base station (BS), at least one downlink (DL) transmission with corresponding hybrid automatic repeat request acknowledgement (HARQ-ACK) feedback to be transmitted in a physical uplink control channel (PUCCH) in a slot; determining that the PUCCH overlaps with a physical uplink shared channel (PUSCH), wherein the PUSCH is configured to be transmitted by the UE in the slot; and transmitting, to the BS, the PUSCH in the slot, wherein configured grant uplink control information (CG-UCI) associated with the PUSCH and the HARQ-ACK feedback are multiplexed on the PUSCH.

20 Claims, 7 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0007129 A1* | 1/2021 | Talarico | ............ H04W 72/1268 |
| 2022/0174721 A1* | 6/2022 | Oviedo | ................. H04L 5/0053 |
| 2022/0279570 A1* | 9/2022 | Li | ......................... H04L 1/1812 |

OTHER PUBLICATIONS

Xiaomi, Discussion on configured grant enhancement for NR-U, 3GPP TSG RAN WG1 #99, R1-1911993, Nov. 18-22, 2019, pp. 1-3, Reno, USA.

Vivo, Discussion on the enhancements to configured grants, 3GPP TSG RAN WG1 #99, R1-1912015, Nov. 18-22, 2019, pp. 1-10, Reno, USA.

Samsung, Enhancements on configured grant for NR-U, 3GPP TSG RAN WG1 #99, R1-1912452, Nov. 18-22, 2019, pp. 1-5, Reno, USA.

Vivo, Discussion on the enhancements to configured grants, 3GPP TSG RAN WG1 #98bis, R1-1910207, Oct. 14-20, 2019, pp. 1-9, Chongqing, China.

* cited by examiner

METHOD AND APPARATUS FOR HARQ-ACK FEEDBACK TRANSMISSION

TECHNICAL FIELD

Embodiments of the present disclosure generally relate to wireless communication technology, and more particularly to hybrid automatic repeat request acknowledgement (HARQ-ACK) feedback transmission.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may communicate with a base station via uplink (UL) communication signals. UL communication signals may include data signals conveying information content and control signals conveying, for example, uplink control information (UCI). In a wireless communication system such as an NR-U (NR system access on an unlicensed spectrum) system, when a configured grant (CG) physical uplink shared channel (PUSCH) is transmitted on an unlicensed spectrum, associated CG-UCI may be multiplexed on the PUSCH. A UE may also transmit hybrid automatic repeat request acknowledgement (HARQ-ACK) feedback (e.g., included in a HARQ-ACK codebook) corresponding to PDSCH transmissions through a PUSCH or physical uplink control channel (PUCCH).

There is a need for handling HARQ-ACK feedback transmission on an unlicensed spectrum.

SUMMARY

Some embodiments of the present disclosure provide a method for wireless communications performed by a user equipment (UE). The method may include: receiving, from a base station (BS), at least one downlink (DL) transmission with corresponding hybrid automatic repeat request acknowledgement (HARQ-ACK) feedback to be transmitted in a physical uplink control channel (PUCCH) in a slot; determining that the PUCCH overlaps with a physical uplink shared channel (PUSCH), wherein the PUSCH is configured to be transmitted by the UE in the slot; and transmitting, to the BS, the PUSCH in the slot, wherein configured grant uplink control information (CG-UCI) associated with the PUSCH and the HARQ-ACK feedback are multiplexed on the PUSCH.

Some embodiments of the present disclosure provide a method for wireless communications performed by a base station (BS). The method may include: transmitting, to a user equipment (UE), a first number of downlink (DL) transmissions with corresponding hybrid automatic repeat request acknowledgement (HARQ-ACK) feedback to be transmitted in a physical uplink control channel (PUCCH) in a slot; determining that the PUCCH overlaps with a physical uplink shared channel (PUSCH), wherein the PUSCH is configured to be transmitted by the UE in the slot; and receiving, from the UE, the PUSCH in the slot, wherein configured grant uplink control information (CG-UCI) associated with the PUSCH and the HARQ-ACK feedback are multiplexed on the PUSCH.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
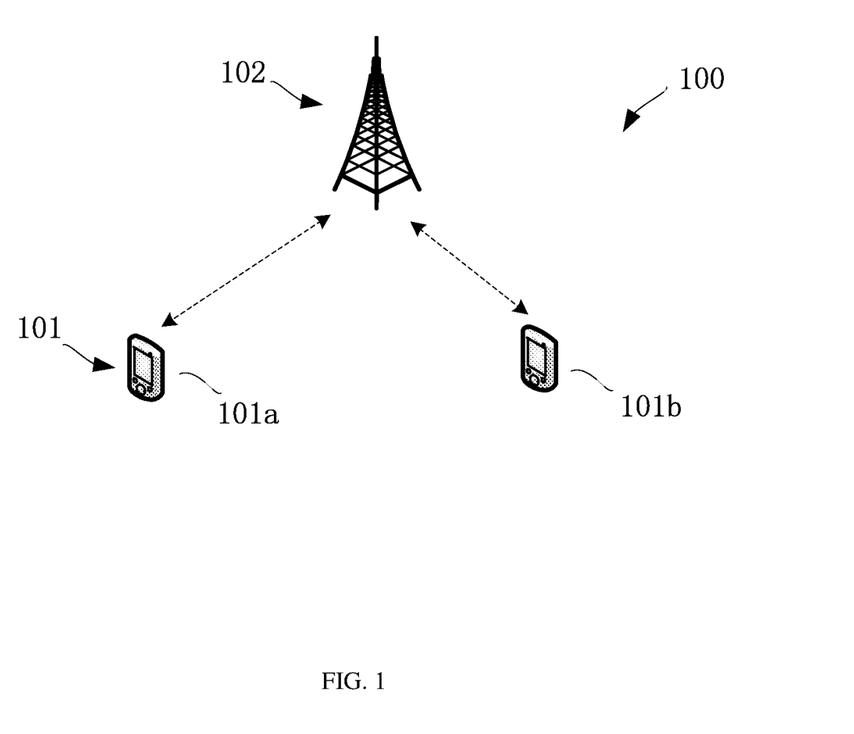
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with BSs 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In an uplink, configured grant (CG) resources may be configured to a UE by a BS. The UE may use these CG resources to transmit data on a physical uplink shared channel (PUSCH). Two schemes for CG transmission may be supported, mainly differing in the ways they are activated:
 configured grant type 1 (hereinafter, "Type 1"), where an uplink grant is provided by radio resource control (RRC) signaling, including the activation of the configured grant; and
 configured grant type 2 (hereinafter, "Type 2"), where the uplink transmission periodicity is provided by radio resource control (RRC) signaling and the activation/deactivation as well as necessary information for transmission is provided by layer 1 (L1) control signaling, which functions in a similar way as in the downlink (DL) (e.g., similar to DL semi-persistent scheduling (SPS)).

The benefits of the two schemes are similar, namely to reduce control signaling overhead and, to some extent, to reduce latency as no scheduling request-UL grant cycle is needed prior to data transmission.

Type 1 may set all the transmission parameters, including but not limited to, periodicity, time offset, and frequency resources as well as the modulation and coding scheme (MCS) of possible uplink transmissions, using RRC signaling. Type 2 is similar to DL SPS. For example, RRC signaling may be used to configure the periodicity of possible uplink transmissions, while the activation downlink control information (DCI) may provide other necessary transmission parameters. The UE shall not transmit anything on the configured resources if the higher layers (e.g., RRC layer) did not deliver a transport block (TB) to transmit on the resources allocated for an uplink transmission without a dynamic grant. For both Type 1 and Type 2, a BS can configure multiple UEs with overlapping time-frequency resources in the uplink as long as the BS can differentiate UL transmissions from the multiple UEs.

UEs and BSs may operate in both a licensed spectrum and unlicensed spectrum. When a CG-PUSCH (e.g., a PUSCH transmission with a Type 1 configured grant or Type 2 configured grant) is transmitted on an unlicensed spectrum, associated CG-UCI may be multiplexed on the CG-PUSCH. The CG-UCI may include necessary information for a BS to decode the CG-PUSCH. For example, the CG-UCI may include a HARQ process number, redundancy version (RV), and new data indicator (NDI), and channel occupancy time (COT) sharing information for the BS to share the UE-initiated COT. Associated CG-UCI may be multiplexed on every CG-PUSCH transmitted on an unlicensed spectrum.

Table 1 below shows an exemplary mapping order of CG-UCI fields. It should be understood that Table 1 is only for illustrative purposes, and should not be construed as limiting the embodiments of the present disclosure.

TABLE 1

| Field | Bitwidth |
|---|---|
| HARQ process number | 4 |
| Redundancy version | 2 |
| New data indicator | 1 |
| COT sharing information | $\lceil \log_2 C \rceil$, both higher layer parameter "ULtoDL-CO-SharingED-Threshold-r16" and higher layer parameter "cg-COT-SharingList-r16" are configured, where "⌈ ⌉" is the ceiling function, and C is the number of combinations configured in "cg-COT-SharingList-r16"; 1, if higher layer parameter "ULtoDL-CO-SharingED-Threshold-r16" is not configured and higher layer parameter "cg-COT-SharingOffset-r16" is configured; 0, otherwise. |

In some embodiments of the present disclosure, when, in a certain slot, a PUSCH transmission scheduled by UL grant (e.g., downlink control information (DCI) format 0_1) overlaps with a PUCCH transmission carrying HARQ-ACK feedback corresponding to PDSCH transmissions and DCI for DL SPS release (if any), a UE may multiplex the HARQ-ACK feedback on the PUSCH. The UE may use the field indicating a UL downlink assignment index (DAI) in the UL grant (e.g., the DCI) to determine the number of HARQ-ACK feedback information bits which are to be transmitted on the scheduled PUSCH transmission.

In some embodiments of the present disclosure, when, in a certain slot, a CG-PUSCH transmission overlaps with a PUCCH transmission carrying HARQ-ACK feedback, it may be inevitable to multiplex the HARQ-ACK feedback on the CG-PUSCH for single carrier property. Since, as mentioned above, the CG-UCI may also be multiplexed on the CG-PUSCH, solutions need to be provided for transmitting both CG-UCI and HARQ-ACK feedback on the same CG-PUSCH. More details on the embodiments of the present disclosure will be illustrated in the following text in combination with the appended drawings.

In some embodiments of the present disclosure, the CG-UCI and HARQ-ACK feedback may be jointly encoded by, for example, Reed-Muller coding (e.g., when the total number of CG-UCI information bits and the HARQ-ACK feedback information bits is equal to or less than 11) or polar coding (e.g., when the total number of CG-UCI information bits and the HARQ-ACK feedback information bits is greater than 11). Then, the jointly encoded bits may be multiplexed on the CG-PUSCH.

In some circumstances, for example, when a UE is configured with a dynamic HARQ-ACK codebook (e.g., Type 2 HARQ-ACK codebook) and the UE misses the last DCI for scheduling a corresponding PDSCH transmission, the UE and BS may have different understandings of the total number of CG-UCI information bits and HARQ-ACK feedback information bits. This is because the codebook size of the Type 2 HARQ-ACK codebook multiplexed on the CG PUSCH may not be consistent with what the BS expects. As a result, this inconsistency would render the BS unable to decode the CG-UCI as well as the CG-PUSCH transmission since the HARQ-ACK feedback is jointly encoded with the CG-UCI.

Figure 2:
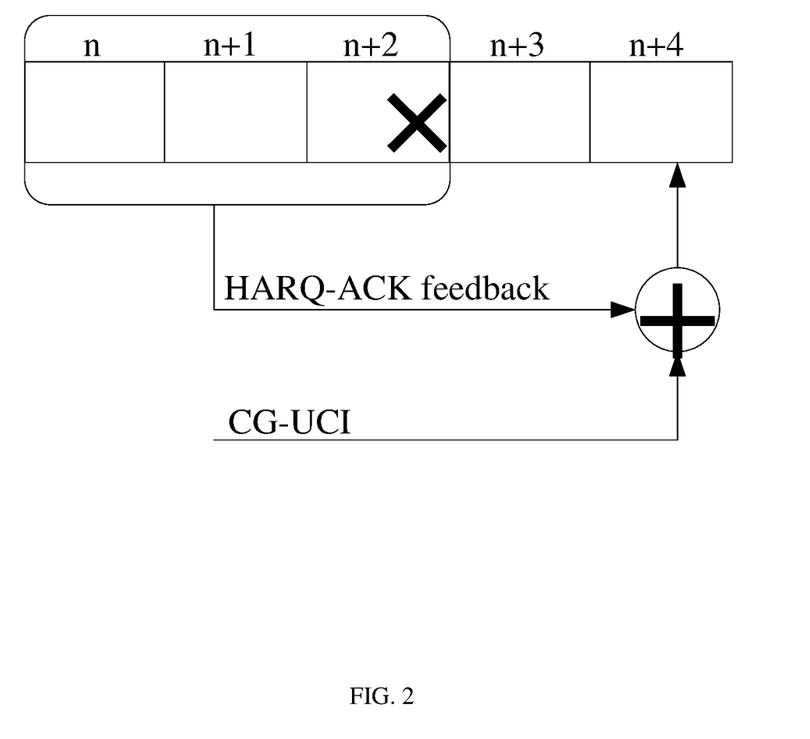
FIG. 2 illustrates a conceptual diagram of multiplexing CG-UCI and HARQ-ACK feedback on a PUSCH in accordance with some embodiments of the present disclosure.

FIG. 2 illustrates a conceptual diagram of multiplexing CG-UCI and HARQ-ACK feedback on a PUSCH in accordance with some embodiments of the present disclosure.

It should be understood that configurations or parameters mentioned in the following text are only for illustrative purposes, and should not be construed as limiting the embodiments of the present disclosure. Also, details described in all of the foregoing embodiments of the present disclosure are applicable for the embodiments shown in FIG. 2.

In FIG. 2, a BS may transmit a DCI to a UE to schedule a downlink (DL) transmission (e.g., PDSCH transmission). The DCI may include a downlink assignment index (DAI) to facilitate the HARQ-ACK feedback corresponding to the PDSCH transmission. For example, the DCI may include a DAI field, which may be applicable for multiplexing HARQ-ACK information in a PUSCH transmission.

The DAI field may indicate a counter DAI, a total DAI, or both. When there may be at most one PDCCH monitoring occasion in each slot, the counter DAI may denote the accumulative number of downlink transmissions, up to the present serving cell and present slot, wherein the accumulative number increments first in increasing order of serving cell index and then in increasing order of slot index; and the total DAI may denote the total number of downlink transmissions up to a present slot and shall be updated from slot to slot. The UE shall assume the same value of total DAI in all downlink transmissions in a slot. When there may be more than one PDCCH monitoring occasion in each slot, the value of the counter DAI field in DCI formats may denote the accumulative number of {serving cell, PDCCH monitoring occasion}-pair(s) in which PDSCH reception(s) or SPS PDSCH release associated with the DCI formats is present up to the current serving cell and current PDCCH monitoring occasion. The value of the total DAI in a DCI format denotes the total number of {serving cell, PDCCH monitoring occasion}-pair(s) in which PDSCH reception(s) or SPS PDSCH release associated with DCI formats is present, up to the current PDCCH monitoring occasion and is updated from a PDCCH monitoring occasion to a PDCCH monitoring occasion. The counter DAI or total DAI may be indicated by two bits, "00," "01," "10," or "11," which may be mapped to numeric values of "1," "2," "3," and "4," respectively.

Referring to FIG. 2, the BS may transmit to a UE three PDSCHs in slot n, slot n+1, and slot n+2, respectively. Each of the three PDSCHs corresponds to a respective counter DAI indicating the order of a corresponding HARQ-ACK information bit(s) in the HARQ-ACK codebook to be transmitted to the BS.

In some examples, the DCIs scheduling the three PDSCHs may indicate the same slot (e.g., slot n+4) for PUCCH transmission in, for example, PDSCH-to-HARQ_timing field of the DCIs. In this case, the UE is supposed to transmit the HARQ-ACK feedback corresponding to the three PDSCHs in one PUCCH in slot n+4. However, when there is an overlap between a CG-PUSCH and the PUCCH carrying the HARQ-ACK feedback in slot n+4, the UE may transmit the HARQ-ACK feedback on the CG-PUSCH in slot n+4.

For example, the UE may jointly encode the CG-UCI associated with the CG-PUSCH and the HARQ-ACK feedback. Specifically, the UE may concatenate the CG-UCI information bits and the HARQ-ACK feedback information bits, encode the concatenated bits via Reed-Muller coding or polar coding, and transmit the encoded bits on the CG-PUSCH.

When the DCI scheduling the PDSCH in slot n+2 is missed by the UE, the UE cannot identify the PDSCH in slot n+2 scheduled by the missed DCI. Consequently, from the UE's perspective, the HARQ-ACK codebook may not include the HARQ-ACK feedback for the PDSCH in slot n+2, and may only include the HARQ-ACK feedback for the PDSCHs in slots n and n+1. However, the BS may expect a HARQ-ACK codebook including the HARQ-ACK feedback for all three PDSCHs in slots n+0, n+1 and n+2. This mismatched HARQ-ACK codebook may lead to inconsistent numbers of jointly encoded bits of CG-UCI and the HARQ-ACK feedback, which may cause the BS not able to correctly decode the CG-UCI and associated CG-PUSCH.

Embodiments of present disclosure further provide solutions to solve the above problem caused by any misunderstanding of the HARQ-ACK codebook size between a BS and a UE. More details on the embodiments of the present disclosure will be illustrated in the following text in combination with the appended drawings.

In some embodiments of the present disclosure, the CG-UCI and the HARQ-ACK feedback may be separately encoded, and then transmitted on the corresponding PUSCH.

In some embodiments of the present disclosure, the CG-UCI may indicate the DAI of the last DL transmission of the DL transmissions (e.g., PDSCH transmissions and/or DCI indicating DL SPS release) received by a UE from a BS. The CG-UCI may include two bits indicating the DAI of the last DL transmission. When the total DAI exists in the DCI scheduling the last DL transmission, the DAI included in the CG-UCI indicates the total DAI in the DCI. When the total DAI does not exist in the DCI scheduling the last DL transmission, the DAI included in the CG-UCI indicates the counter DAI in the DCI.

At both the BS and UE sides, the calculation of the number of resource elements (REs) for transmitting the CG-UCI is performed independently from the calculation of the number of REs for transmitting the HARQ-ACK feedback. The UE may encode the CG-UCI separately with the HARQ-ACK feedback. The UE may map the encoded CG-UCI in the next symbol immediately following the first demodulation reference signal (DMRS) symbol with rate-matching on the calculated number of REs for the CG-UCI. The UE may then map the encoded HARQ-ACK feedback with rate-matching on the calculated number of REs for the HARQ-ACK feedback after the REs for the CG-UCI. The above rate-matching may be performed firstly in frequency domain in one symbol from the lowest RE to the highest RE, and then moved to the next symbol.

Since the CG-UCI and HARQ-ACK feedback are separately encoded and rate-matched, a HARQ-ACK feedback transmission (if any) would have no impact on the CG-UCI transmission and/or PUSCH transmission. Also, any misunderstanding of the HARQ-ACK codebook size between the BS and UE would have no impact on the CG-UCI transmission and/or PUSCH transmission.

After receiving the CG-UCI, the BS can determine the HARQ-ACK codebook size and correctly decode the HARQ-ACK feedback as well as the CG-PUSCH. For example, the BS may determine the HARQ-ACK codebook size based on the DAI in the CG-UCI. Since the CG-UCI indicates the latest DAI received by the UE, the BS can identify whether the actual last DCI transmitted to the UE from the BS is missed or not at the UE, and thus determine the HARQ-ACK codebook size assumed by the UE. Furthermore, based on the determined HARQ-ACK codebook size, the BS can determine the REs occupied for transmitting the HARQ-ACK feedback so as to identify the remaining REs for transmitting the CG-PUSCH and correctly decode the CG-PUSCH.

For example, based on the DAI indicated in the received CG-UCI, the BS can identify whether the actual last DCI transmitted to the UE from the BS is missed or not at the UE, by comparing the DAI of the actual last DCI and the DAI indicated in the received CG-UCI. In the case that the two DAI are the same, the BS may determine that the actual last DCI is not missed at the UE. The BS may then decode the HARQ-ACK feedback as well as the CG-PUSCH based on a HARQ-ACK codebook size according to the downlink transmissions from the BS to the UE. In the case that the two DAI are different, the BS may determine that the actual last one or more DCI are missed at the UE by subtracting the value of the last transmitted DAI from the value of the DAI indicated in the CG-UCI. The BS may then update the HARQ-ACK codebook size by, for example, excluding the HARQ-ACK feedback for the PDSCH(s) scheduled by the actual last one or more DCI, so that the BS and the UE have the same understanding on the HARQ-ACK codebook size. Furthermore, based on the determined HARQ-ACK codebook size (the HARQ-ACK codebook size according to the downlink transmissions from the BS to the UE or the updated HARQ-ACK codebook size), the BS can determine the REs occupied for transmitting the HARQ-ACK feedback so as to identify the remaining REs for transmitting the CG-PUSCH and correctly decode the CG-PUSCH.

In some embodiments of the present disclosure, the CG-UCI may indicate the least significant bit (LSB) of the DAI of the last DL transmission received by a UE from a BS. The CG-UCI may include one bit indicating the LSB of the DAI of the last DL transmission. This can reduce the overhead in the CG-UCI since only one bit is needed in the CG-UCI to indicate the DAI. When the total DAI exists in the DCI scheduling the last DL transmission, the DAI included in the CG-UCI indicates the LSB of the total DAI in the DCI. When the total DAI does not exist in the DCI scheduling the last DL transmission, the DAI included in the CG-UCI indicates the LSB of the counter DAI in the DCI.

At both the BS and UE sides, the calculation of the number of REs for transmitting the CG-UCI is performed independently from the calculation of the number of REs for transmitting the HARQ-ACK feedback. The UE may encode the CG-UCI separately with the HARQ-ACK feedback. The UE may map the encoded CG-UCI in the next symbol immediately following the first DMRS symbol with rate-matching on the calculated number of REs for the CG-UCI. The UE may then map the encoded HARQ-ACK feedback with rate-matching on the calculated number of REs for the HARQ-ACK feedback after the REs for the CG-UCI. The above rate-matching may be performed firstly in frequency domain in one symbol from the lowest RE to the highest RE, and then moved to the next symbol.

Since the CG-UCI and HARQ-ACK feedback are separately encoded and rate-matched, a HARQ-ACK feedback transmission (if any) would have no impact on the CG-UCI transmission and/or PUSCH transmission. Also, any misunderstanding of the HARQ-ACK codebook size between the BS and UE would have no impact on the CG-UCI transmission and/or PUSCH transmission.

After receiving the CG-UCI, the BS can identify whether the actual last DCI transmitted to the UE from the BS is missed or not at the UE, by comparing the LSB of the DAI of the actual last DCI and the LSB of the DAI indicated in the received CG-UCI. In the case that the two LSBs are the same, the BS may determine that the actual last DCI is not missed at the UE. The BS may then decode the HARQ-ACK feedback as well as the CG-PUSCH based on a HARQ-ACK codebook size expected by the BS. In the case that the two LSBs are different, the BS may determine that the actual last DCI is missed at the UE. The BS may then update the HARQ-ACK codebook size by, for example, excluding the HARQ-ACK feedback for the PDSCH scheduled by the actual last DCI, so that the BS and the UE have the same understanding on the HARQ-ACK codebook size. Furthermore, based on the determined HARQ-ACK codebook size (the HARQ-ACK codebook size expected by the BS or the updated HARQ-ACK codebook size), the BS can determine the REs occupied for transmitting the HARQ-ACK feedback so as to identify the remaining REs for transmitting the CG-PUSCH and correctly decode the CG-PUSCH.

Figure 3:
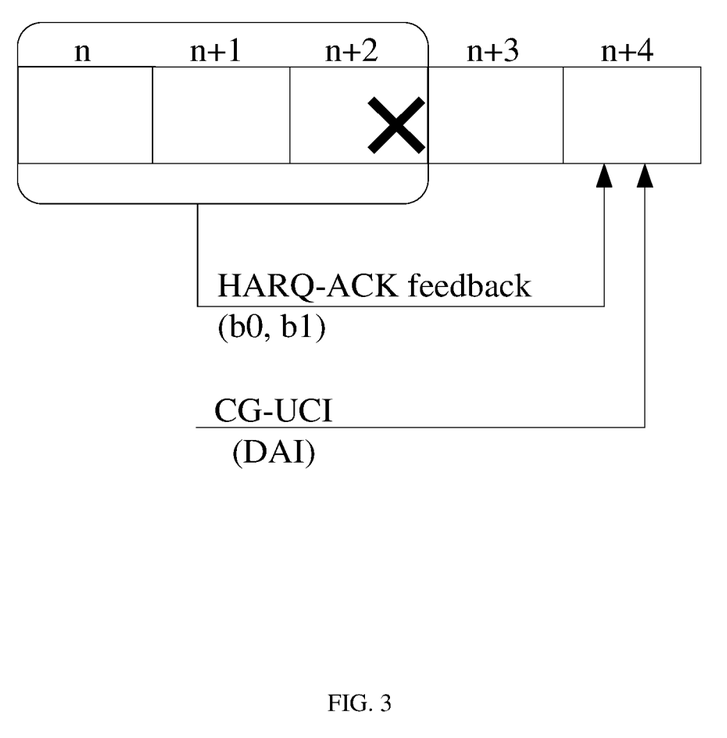
FIG. 3 illustrates a conceptual diagram of multiplexing CG-UCI and HARQ-ACK feedback on a PUSCH in accordance with some embodiments of the present disclosure.

FIG. 3 illustrates a conceptual diagram of multiplexing CG-UCI and HARQ-ACK feedback on a PUSCH in accordance with some embodiments of the present disclosure.

It should be understood that configurations or parameters mentioned in the following text are only for illustrative purposes, and should not be construed as limiting the embodiments of the present disclosure. Also, details described in all of the foregoing embodiments of the present disclosure are applicable for the embodiments shown in FIG. 3.

Referring to FIG. 3, a BS may transmit to a UE three PDSCHs in slot n, slot n+1, and slot n+2, respectively, which are hereinafter referred to as the first, second, and third PDSCHs, respectively. Each of the three PDSCHs corresponds to a respective counter DAI indicating the order of a corresponding HARQ-ACK feedback information bit(s) in the HARQ-ACK codebook to be transmitted to the BS. The DAIs of the first, second, and third PDSCHs are hereinafter referred to as the first, second, and third DAIs, respectively. In FIG. 3, it is assumed that the first, second, and third DAIs are "00," "01," and "10," respectively.

In some embodiments of the present disclosure, the DCIs scheduling the three PDSCHs may indicate the same slot (e.g., slot n+4 in FIG. 3) for the PUCCH transmission. The UE may determine that the PUCCH carrying the HARQ-ACK feedback overlaps with a PUSCH configured to be transmitted by the UE in slot n+4. The UE may then multiplex the CG-UCI associated with the PUSCH and the HARQ-ACK feedback on the PUSCH, and transmit the PUSCH in slot n+4.

Assuming, for simplicity, that a single HARQ-ACK information bit is required for each PDSCH, when the UE receives all three PDSCHs, the UE may generate a HARQ-ACK codebook (e.g., the Type 2 HARQ-ACK codebook) for the PDSCH transmissions including three HARQ-ACK feedback bits (e.g., b0, b1, and b2). In this case, the size of the HARQ-ACK codebook generated at the UE is the same as the HARQ-ACK codebook size expected by the BS.

However, referring to FIG. 3, in the case that the last PDSCH (e.g., the third PDSCH) is missed, the UE may generate a HARQ-ACK codebook including two HARQ-ACK feedback bits (e.g., b0 and b1). In addition, the UE can determine whether other PDSCH(s) (e.g., the first or second PDSCH) is missed or not based on the corresponding DAI. In the case that such PDSCH (e.g., the first or second PDSCH) is missed, the UE may generate a negative ACK (NACK) for the missed PDSCH in the HARQ-ACK codebook.

In some embodiments of the present disclosure, the CG-UCI may indicate the DAI of the last PDSCH transmission of the PDSCH transmissions received by the UE from the BS. For example, referring to FIG. 3, when the third PDSCH is missed, the last PDSCH received at the UE may be the second PDSCH, and the last DAI received at the UE would be "01." In this case, bit "01" may be indicated in the CG-UCI. In some other cases when all three PDSCHs are received at the UE, the last DAI received at the UE would be "10," and bit "10" may be indicated in the CG-UCI.

In some embodiments of the present disclosure, the CG-UCI may indicate the LSB of the DAI of the last PDSCH transmission received by the UE from the BS. For example, referring to FIG. 3, when the third PDSCH is missed, the last PDSCH received at the UE may be the second PDSCH, and the last DAI received at the UE would be "01." In this case, bit "1" may be indicated in the CG-UCI. In some other cases when all three PDSCHs are received at the UE, the last DAI received at the UE would be "10," and bit "0" may be indicated in the CG-UCI.

The UE may encode the CG-UCI information bits and HARQ-ACK feedback information bits (e.g., the HARQ-ACK codebook) separately, and may transmit the encoded bits on the PUSCH in slot n+4, according to, for example, the methods as described above. Since the CG-UCI and HARQ-ACK feedback are independent, the missed PDSCH in slot n+2 would have no impact on the CG-UCI decoding at the BS.

From the perspective of the BS, since it transmits three PDSCHs to the UE, it may expect to receive a HARQ-ACK codebook including three HARQ-ACK feedback bits from the UE. In other words, the BS may expect that the CG-UCI indicates a DAI having a value of "10" (in the case that the DAI of the last PDSCH transmission is included in the CG-UCI) or "0" (in the case that the LSB of the DAI of the last PDSCH transmission is included in the CG-UCI).

After receiving the PUSCH from the UE, the BS may decode the CG-UCI, and may determine whether the DAI (or the LSB of the DAI) indicated in the CG-UCI is the same as the value expected by the BS. For example, when the CG-UCI indicates DAI having a value of "10" (or a value of "0") the BS would know that the last DCI transmitted by the BS is not missed by the UE. When the CG-UCI indicates DAI having a value of "01" (or a value of "1") the BS would know that the last DCI transmitted by the BS is missed by the UE. In this way, gNB can identify whether the last DCI is missed or not and further determine the HARQ-ACK codebook size. For example, in the latter case when the last DCI is missed, the BS may determine the size of the HARQ-ACK codebook size being 2 bits (e.g., including b0 and b1). Based on the determined HARQ-ACK codebook size, the BS can determine the REs occupied by the HARQ-ACK feedback in the PUSCH and can correctly decode the HARQ-ACK feedback. Further, the BS can correctly decode the PUSCH. The decoding order corresponds to the encoding/mapping order of the PUSCH, and is firstly CG-UCI, secondly HARQ-ACK feedback, and then the CG-PUSCH.

In some embodiments of the present disclosure, the CG-UCI and the HARQ-ACK feedback may be jointly encoded, and then transmitted on the corresponding PUSCH. In these embodiments, to avoid any misunderstanding between the BS and UE of the HARQ-ACK codebook size, quantification may be used to align the current HARQ-ACK codebook size to a specific HARQ-ACK codebook size.

For example, both the BS and UE side may determine the HARQ-ACK codebook size based on a set of HARQ-ACK codebook sizes. In some embodiments, the set of HARQ-ACK codebook sizes may be predefined, for example, in standards. In some embodiments, a BS may configure the set of HARQ-ACK codebook sizes to a UE via, for example, an RRC signaling message.

An example of the set of HARQ-ACK codebook sizes may be {4, 8, 12, 16, 20, 24, 28, 32}. A UE may first determine a HARQ-ACK codebook size based on the received DL transmissions (e.g., PDSCH transmissions), the UE may look up the set of HARQ-ACK codebook sizes to determine whether this HARQ-ACK codebook size should be updated. For example, when the UE determines that the HARQ-ACK codebook size based on the received DL transmissions (hereinafter, "current HARQ-ACK codebook size") is included in the set of HARQ-ACK codebook sizes, the UE may determine not to update the current HARQ-ACK codebook size. When the UE determines that the current HARQ-ACK codebook size is not included in the set of HARQ-ACK codebook sizes, the UE may update the current HARQ-ACK codebook size with a specific value in the set of HARQ-ACK codebook sizes, wherein the specific value is the minimum codebook size in the set of HARQ-ACK codebook sizes larger than the current codebook size.

A similar procedure may be performed at a BS. For example, the BS may determine a HARQ-ACK codebook size based on the DL transmissions to the UE. If the HARQ-ACK codebook size is included in the set of HARQ-ACK codebook sizes, the BS may decode the HARQ-ACK codebook based on the HARQ-ACK codebook size. Otherwise, if the HARQ-ACK codebook size is not included in the set of HARQ-ACK codebook sizes, the BS may update the current HARQ-ACK codebook size with a specific value in the set of HARQ-ACK codebook sizes, wherein the specific value is the minimum codebook size in the set of HARQ-ACK codebook sizes larger than the current codebook size.

For example, referring to FIG. 3, assuming that a UE receives three PDSCH transmissions in slot n, slot n+1, and slot n+2, respectively, and a single HARQ-ACK information bit is required for each PDSCH, the UE may determine a codebook size for a HARQ-ACK codebook including the HARQ-ACK feedback corresponding to the three PDSCH transmission being 3 bits. However, 3 bits is not included in the set of HARQ-ACK codebook sizes (e.g., {4, 8, 12, 16, 20, 24, 28, 32}). The UE may then determine to update the codebook size to 4 bits, which is the minimum codebook size in the set of HARQ-ACK codebook sizes larger than 3 bits. Since the HARQ-ACK feedback information bits corresponding to the three PDSCH transmission only has 3 bits, negative acknowledgement (NACK) bits may be used as padding bits to align the updated codebook size. In this case, one NACK bit may be padded at the end of the three HARQ-ACK feedback information bits. In other words, the number of padding bits in the HARQ-ACK codebook may be equal to the updated codebook size minus the original codebook size. In the case that the original determined codebook size is included in the set of HARQ-ACK codebook sizes, no padding would be needed.

Similarly, the BS may first determine a HARQ-ACK codebook size of 3 bits based on the PDSCH transmissions, and may then update the HARQ-ACK codebook size to 4 bits based on the set of HARQ-ACK codebook sizes. The BS may decode a HARQ-ACK codebook from the PUSCH transmission received from the UE based on the updated HARQ-ACK codebook size.

After quantification, the UE may jointly encode the CG-UCI and the HARQ-ACK feedback, which may include NACK bit(s) for padding. The UE may calculate the number of REs for transmitting the CG-UCI and HARQ-ACK feedback based on the total number of the CG-UCI information bits and HARQ-ACK feedback information bits. The UE may map the jointly encoded bits in the next symbol immediately following the first DMRS symbol with rate-matching on the calculated number of REs for the CG-UCI and HARQ-ACK feedback.

At the BS side, after determining the HARQ-ACK codebook size by the above quantification procedure, the BS may decode the HARQ-ACK codebook based on the HARQ-ACK codebook size. For example, the BS may decode the jointly encoded CG-UCI and HARQ-ACK feedback based on the quantified HARQ-ACK codebook size and the number of CG-UCI information bits. In this way, the BS can determine the REs occupied for transmitting both the CG-UCI and HARQ-ACK feedback so as to identify the remaining REs for transmitting the PUSCH and correctly decode the PUSCH.

Figure 4:
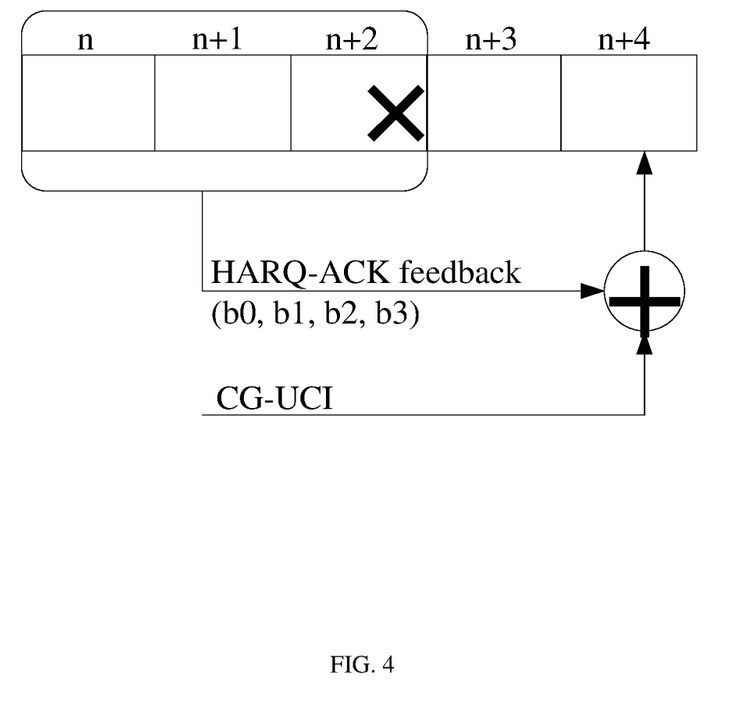
FIG. 4 illustrates a conceptual diagram of multiplexing CG-UCI and HARQ-ACK feedback on a PUSCH in accordance with some embodiments of the present disclosure.

FIG. 4 illustrates a conceptual diagram of multiplexing CG-UCI and HARQ-ACK feedback on a PUSCH in accordance with some embodiments of the present disclosure.

It should be understood that configurations or parameters mentioned in the following text are only for illustrative purposes, and should not be construed as limiting the embodiments of the present disclosure. Also, details described in all of the foregoing embodiments of the present disclosure are applicable for the embodiments shown in FIG. 4.

Referring to FIG. 4, a BS may transmit to a UE three PDSCHs in slot n, slot n+1, and slot n+2, respectively, which are hereinafter referred to as the first, second, and third PDSCHs, respectively. In some embodiments of the present disclosure, the BS may transmit an RRC message indicating a set of HARQ-ACK codebook sizes to the UE. In some other embodiments of the present disclosure, the set of HARQ-ACK codebook sizes may be predefined, for example, according to a standard. In the example of FIG. 4, it is assumed that the set of HARQ-ACK codebook sizes is {4, 8, 12, 16, 20, 24, 28, 32}. It should be appreciated by persons skilled in the art that different sets of HARQ-ACK codebook size may be applied.

In some embodiments of the present disclosure, the DCIs scheduling the three PDSCHs may indicate the same slot (e.g., slot n+4 in FIG. 4) for PUCCH transmission. The UE may determine that the PUCCH carrying the HARQ-ACK feedback overlaps with a PUSCH configured to be transmitted by the UE in slot n+4. The UE may then multiplex the CG-UCI associated with the PUSCH and the HARQ-ACK feedback on the PUSCH, and transmit the PUSCH in slot n+4.

Assuming, for simplicity, that a single HARQ-ACK information bit is required for each PDSCH, when the UE receives all three PDSCHs from the BS, the UE may determine the codebook size for a HARQ-ACK codebook comprising the HARQ-ACK feedback corresponding to the three PDSCHs being 3 bits (e.g., b0, b1, and b2). Since 3 bits is not included in the set of HARQ-ACK codebook sizes (e.g., {4, 8, 12, 16, 20, 24, 28, 32}), the UE may determine an updated codebook size for the HARQ-ACK codebook being 4 bits. Based on the updated codebook size, the UE may generate the HARQ-ACK codebook including the 3 bits (e.g., b0, b1, and b2) corresponding to the three received PDSCHs and a fourth bit (e.g., b3). The fourth bit is a padding bit and padded with a NACK bit.

Referring to FIG. 4, in the case that the last PDSCH (e.g., the third PDSCH in slot n+2) is missed, the UE may determine the codebook size for a HARQ-ACK codebook comprising the HARQ-ACK feedback corresponding to the two received PDSCHs being 2 bits (e.g., b0 and b1). Since 2 bits is not included in the set of HARQ-ACK codebook sizes (e.g., {4, 8, 12, 16, 20, 24, 28, 32}), the UE may determine an updated codebook size for the HARQ-ACK codebook being 4 bits. Based on the updated codebook size, the UE may generate the HARQ-ACK codebook including the 2 bits (e.g., b0 and b1) corresponding to the two received PDSCHs and third and fourth bits (e.g., b2 and b3). The third and fourth bits are padding bits and padded with NACK bits.

Then, the UE may jointly encode the CG-UCI information bits and HARQ-ACK feedback information bits (e.g., the HARQ-ACK codebook), and may transmit the encoded bits on the PUSCH in slot n+4, according to, for example, the methods as described above.

At the BS side, based on the three PDSCHs transmitted by the BS, the BS may determine the codebook size for a HARQ-ACK codebook comprising the HARQ-ACK feedback corresponding to the three PDSCHs being 3 bits. Since 3 bits is not included in the set of HARQ-ACK codebook sizes (e.g., {4, 8, 12, 16, 20, 24, 28, 32}), the BS may determine an updated codebook size for the HARQ-ACK codebook being 4 bits.

Based on the updated codebook size, the BS may decode the HARQ-ACK codebook after receiving the PUSCH. For example, the BS may determine the REs occupied by the CG-UCI and HARQ-ACK feedback in the received PUSCH based on the updated codebook size as well as the number of CG-UCI information bits. After decoding the CG-UCI and HARQ-ACK feedback, the BS can correctly decode the PUSCH.

Since the codebook size is quantified, the BS and UE would have a consistent understanding of the HARQ-ACK codebook size. Thus, the BS can correctly decode the CG-UCI and the HARQ-ACK codebook multiplexed on the PUSCH as well as the PUSCH.

Figure 5:
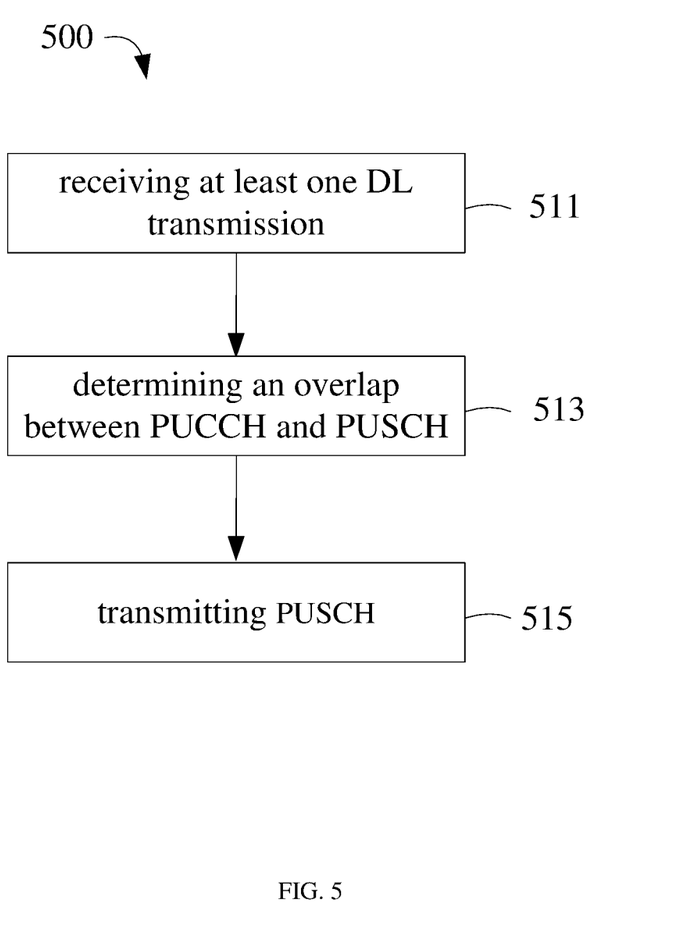
FIG. 5 illustrates a flow chart of an exemplary procedure of wireless communications in accordance with some embodiments of the present disclosure.

FIG. 5 illustrates a flow chart of an exemplary procedure 500 for wireless communications in accordance with some embodiments of the present disclosure. Details described in all of the foregoing embodiments of the present disclosure are applicable for the embodiments shown in FIG. 5. The procedure may be performed by a UE, for example, UE101 in FIG. 1.

Referring to FIG. 5, in operation 511, a UE may receive, from a BS, at least one DL transmission (e.g., PDSCH transmission). The UE may be indicated to transmit HARQ-ACK feedback for the at least one DL transmission in a PUCCH in a slot (e.g., slot n+4 in FIGS. 3 and 4). The UE may also be configured to transmit a PUSCH in the slot. For example, the UE may receive an RRC signaling for configuring the PUSCH in the slot.

In operation 513, the UE may determine an overlap between the PUCCH and the PUSCH in the slot. The UE may multiplex the CG-UCI associated with the PUSCH and the HARQ-ACK feedback on the PUSCH. The UE may multiplex the CG-UCI and the HARQ-ACK feedback on the PUSCH according to one of the methods described above with respect to FIGS. 3 and 4.

For example, in some embodiments of the present disclosure, the CG-UCI and HARQ-ACK feedback may be separately encoded.

In some embodiments of the present disclosure, the CG-UCI may indicate a DAI of the last DL transmission of the at least one DL transmission. In some embodiments of the present disclosure, the DAI may be a total DAI in response to the total DAI that exists in the DCI scheduling the last DL transmission of the at least one DL transmission. In some embodiments of the present disclosure, the DAI may be a counter DAI in response to the total DAI that does not exist in the DCI scheduling the last DL transmission of the at least one DL transmission. For example, referring to FIG. 3, in the case that the last PDSCH in slot n+2 is missed at the UE, the CG-UCI may indicate the DAI of the PDSCH in slot n+1, e.g., "01."

In some embodiments of the present disclosure, the CG-UCI may indicate the LSB of a DAI of the last DL transmission of the at least one DL transmission. In some embodiments of the present disclosure, the DAI may be a total DAI in response to the total DAI that exists in the DCI scheduling the last DL transmission of the at least one DL transmission. In some embodiments of the present disclosure, the DAI may be a counter DAI in response to the total DAI that does not exist in the DCI scheduling the last DL transmission of the at least one DL transmission. For example, referring to FIG. 3, in the case that the last PDSCH in slot n+2 is missed at the UE, the CG-UCI may indicate the LSB of the DAI of the PDSCH in slot n+1, e.g., "1."

In some embodiments of the present disclosure, the CG-UCI and HARQ-ACK feedback may be jointly encoded.

In some embodiments of the present disclosure, the UE may receive an RRC message indicating a set of HARQ-ACK codebook sizes from the BS. In some other embodiments of the present disclosure, the set of HARQ-ACK codebook sizes may be predefined, for example, according to a standard. In some examples, the set of a HARQ-ACK codebook sizes may be {4, 8, 12, 16, 20, 24, 28, 32}.

The UE may determine a codebook size for a HARQ-ACK codebook including the HARQ-ACK feedback based on the received at least one DL transmission. The UE may determine whether this codebook size is included in the set of HARQ-ACK codebook sizes. In response to the codebook size being included in the set of HARQ-ACK codebook sizes, the UE may generate the HARQ-ACK codebook based on this codebook size.

For example, assuming that the UE receives four DL transmissions from the BS, and a single HARQ-ACK information bit is required for each DL transmission, the codebook size determined based on the received DL transmissions is 4 bits, which is included in the set {4, 8, 12, 16, 20, 24, 28, 32}. In this case, the UE may generate the HARQ-ACK codebook including 4 HARQ-ACK feedback information bits for the four DL transmissions.

In response to the codebook size ("the original codebook size") being not included in the set of HARQ-ACK codebook sizes, the UE may generate the HARQ-ACK codebook based on an updated codebook size. The updated codebook size is a minimum codebook size in the set of HARQ-ACK codebook sizes which is larger than the original codebook size.

For example, referring to FIG. 4, in the case that the last PDSCH in slot n+2 is missed at the UE, the UE may determine the original codebook size for a HARQ-ACK codebook being 2 bits, which is not included in the set {4, 8, 12, 16, 20, 24, 28, 32}. In this case, the UE may determine an updated codebook size for the HARQ-ACK codebook being 4 bits. The UE may generate the HARQ-ACK codebook including 4 HARQ-ACK feedback information bits. The first two bits of the HARQ-ACK codebook may include the HARQ-ACK feedback for the two received PDSCHs. And the last two bits of the HARQ-ACK codebook are padded with NACK bits. In other words, the number of padding bits in the HARQ-ACK codebook may be equal to the updated codebook size minus the original codebook size.

In operation 515, the UE may transmit, to the BS, the PUSCH in the slot (e.g., slot n+4 in FIGS. 3 and 4).

It should be appreciated by persons skilled in the art that the sequence of the operations in exemplary procedure 500 may be changed and some of the operations in exemplary procedure 500 may be eliminated or modified, without departing from the spirit and scope of the disclosure.

Figure 6:
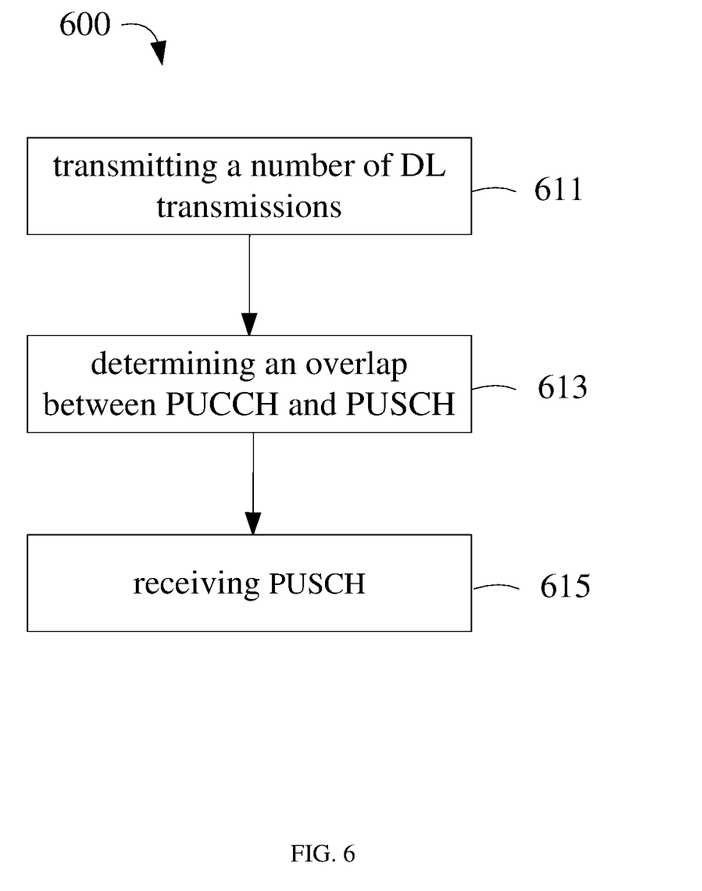
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. The procedure may be performed by a BS, for example, BS 102 in FIG. 1.

Referring to FIG. 6, in operation 611, a BS may transmit, to a UE, a number of DL transmissions (e.g., PDSCH transmission). The BS may indicate the UE to transmit HARQ-ACK feedback for the DL transmission in a PUCCH in a slot (e.g., slot n+4 in FIGS. 3 and 4). The BS may configure the UE to transmit a PUSCH in the slot. For example, the BS may transmit to a UE an RRC signaling for configuring the PUSCH in the slot. In operation 613, the BS may determine an overlap between the PUCCH and the PUSCH in the slot. The BS would know that the CG-UCI associated with the PUSCH and the HARQ-ACK feedback for the DL transmission may be multiplexed on the PUSCH according to one of the methods described above with respect to FIGS. 3 and 4. In operation 615, the BS may receive from the UE the PUSCH in the slot (e.g., slot n+4 in FIGS. 3 and 4).

In some embodiments of the present disclosure, the CG-UCI and HARQ-ACK feedback may be separately encoded. In some embodiments of the present disclosure, the CG-UCI may indicate a DAI latest received by the UE among the number of DL transmissions transmitted by the BS. In some embodiments of the present disclosure, the CG-UCI may indicate the LSB of a DAI latest received by the UE among the number of DL transmissions. In some embodiments of the present disclosure, the DAI may be a total DAI in response to the total DAI that exists in the DCI latest received by the UE for scheduling the number of DL transmissions. In some embodiments of the present disclosure, the DAI may be a counter DAI in response to the total DAI that does not exist in the DCI latest received by the UE for scheduling the number of DL transmissions.

For example, referring to FIG. 3, in the case that the last PDSCH in slot n+2 is missed at the UE, the CG-UCI may indicate the DAI (e.g., "01") of the PDSCH in slot n+1 or the LSB (e.g., "1") of the DAI of the PDSCH in slot n+1.

In some embodiments of the present disclosure, the CG-UCI and HARQ-ACK feedback may be jointly encoded. In some embodiments of the present disclosure, the BS may transmit an RRC message indicating a set of HARQ-ACK codebook sizes to the UE. In some other embodiments of the present disclosure, the set of HARQ-ACK codebook sizes may be predefined, for example, according to a standard. In some examples, the set of HARQ-ACK codebook sizes may be {4, 8, 12, 16, 20, 24, 28, 32}.

The BS may determine a codebook size for a HARQ-ACK codebook including the HARQ-ACK feedback based on the number of DL transmissions. The BS may determine whether this codebook size is included in the set of HARQ-ACK codebook sizes. In response to the codebook size being included in the set of HARQ-ACK codebook sizes, the BS may decode the HARQ-ACK codebook from the received PUSCH based on this codebook size.

For example, assuming that the BS transmits four DL transmissions to the UE, and a single HARQ-ACK information bit is required for each DL transmission, the codebook size determined based on the transmitted DL transmissions is 4 bits, which is included in the set {4, 8, 12, 16, 20, 24, 28, 32}. In this case, the BS may decode the HARQ-ACK codebook from the received PUSCH based on the codebook size of 4 bits.

In response to the codebook size ("the original codebook size") being not included in the set of HARQ-ACK codebook sizes, the BS may determine an updated codebook size. The updated codebook size is a minimum codebook size in the set of HARQ-ACK codebook sizes which is larger than the original codebook size.

For example, referring to FIG. 4, the BS transmits three PDSCH transmissions to the UE. Assuming that a single HARQ-ACK information bit is required for each PDSCH transmission, the BS may determine a codebook size of 3 bits, which is not included in the set {4, 8, 12, 16, 20, 24, 28, 32}. In this case, the BS may determine an updated codebook size of 4 bits. The BS may decode the HARQ-ACK codebook from the received PUSCH based on the updated codebook size of 4 bits. The last bit of the HARQ-ACK codebook is padded with a NACK bit. In other words, the number of padding bits in the HARQ-ACK codebook may be equal to the updated codebook size minus the original codebook size.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
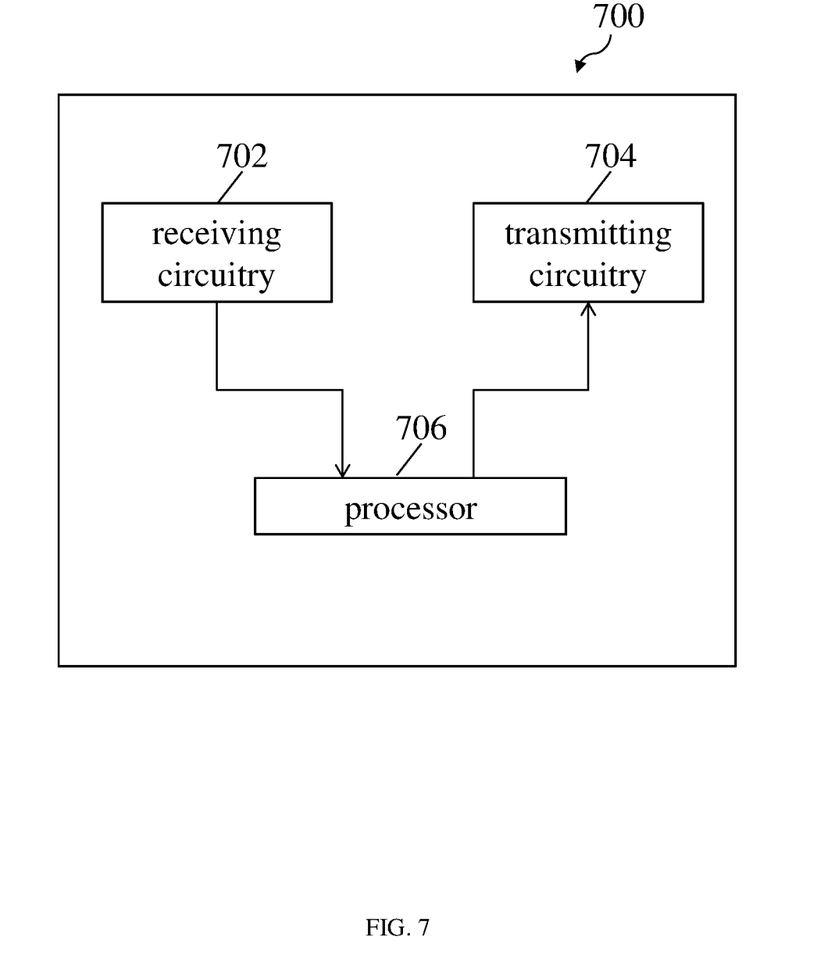
FIG. 7 illustrates a block diagram of an exemplary apparatus in accordance with some embodiments of the present disclosure.

FIG. 7 illustrates an example block diagram of an apparatus 700 according to some embodiments of the present disclosure.

As shown in FIG. 7, the apparatus 700 may include at least one non-transitory computer-readable medium (not illustrated in FIG. 7), at least one receiving circuitry 702, at least one transmitting circuitry 704, and at least one processor 706 coupled to the at least one non-transitory computer-readable medium (not illustrated in FIG. 7), the at least one receiving circuitry 702 and the at least one transmitting circuitry 704. The apparatus 700 may be a base station side apparatus (e.g., a BS) or a communication device (e.g., a UE).

In some embodiments of the present disclosure, the at least one receiving circuitry 702 and the at least one transmitting circuitry 704 can be integrated into a single device, such as a transceiver. In some embodiments of the present disclosure, the apparatus 700 may further include an input device, a memory, and/or other components.

In some embodiments of the present disclosure, the at least one non-transitory computer-readable medium may have stored thereon computer-executable instructions to cause the at least one processor 706 to implement the operations, steps, or methods with respect to the UEs as described above. For example, the computer-executable instructions, when executed, cause the at least one processor 706 interacting with the at least one receiving circuitry 702 and the at least one transmitting circuitry 704, so as to perform the steps with respect to the UEs described in FIGS. 1-5.

For example, the at least one receiving circuitry 702 may receive, from a BS, at least one DL transmission with corresponding HARQ-ACK feedback to be transmitted in a PUCCH in a slot. The at least one processor 706 may determine that the PUCCH overlaps with a PUSCH, wherein the PUSCH is configured to be transmitted by the apparatus in the slot. The at least one transmitting circuitry 704 may transmit, to the BS, the PUSCH in the slot, wherein CG-UCI associated with the PUSCH and the HARQ-ACK feedback are multiplexed on the PUSCH.

In some embodiments of the present disclosure, the at least one non-transitory computer-readable medium may have stored thereon computer-executable instructions to cause the at least one processor 706 to implement the operations, steps, or methods with respect to the BSs as described above. For example, the computer-executable instructions, when executed, cause the at least one processor 706 interacting with the at least one receiving circuitry 702 and the at least one transmitting circuitry 704, so as to perform the steps with respect to the BSs described in FIGS. 1-4 and 6.

For example, the at least one transmitting circuitry 704 may transmit, to a UE, a number of DL transmissions with corresponding HARQ-ACK feedback to be transmitted in a PUCCH in a slot. The at least one processor 706 may determine that the PUCCH overlaps with a PUSCH, wherein the PUSCH is configured to be transmitted by the UE in the slot. The at least one receiving circuitry 702 may receive, from the UE, the PUSCH in the slot, wherein CG-UCI associated with the PUSCH and the HARQ-ACK feedback are multiplexed on the PUSCH.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a user equipment (UE), the method comprising:
   receiving, from a base station, at least one downlink (DL) transmission with corresponding hybrid automatic repeat request acknowledgement (HARQ-ACK) feedback to be transmitted in a physical uplink control channel (PUCCH) in a slot;
   determining that the PUCCH overlaps with a physical uplink shared channel (PUSCH), wherein the PUSCH is configured to be transmitted by the UE in the slot;
   transmitting, to the base station, the PUSCH in the slot, wherein configured grant uplink control information (CG-UCI) associated with the PUSCH and the HARQ-ACK feedback are multiplexed on the PUSCH;
   generating a HARQ-ACK codebook based on a first codebook size in response to the first codebook size being included in a set of HARQ-ACK codebook sizes; and
   generating the HARQ-ACK codebook based on a second codebook size in response to the first codebook size not being included in the set of HARQ-ACK codebook sizes, wherein the second codebook size is a minimum codebook size in the set of HARQ-ACK codebook sizes which is larger than the first codebook size.

2. The method of claim 1, wherein the CG-UCI and the HARQ-ACK feedback are separately encoded.

3. The method of claim 2, wherein the CG-UCI indicates a downlink assignment index (DAI) of a last DL transmission of the at least one DL transmission.

4. The method of claim 3, wherein the DAI is a total DAI in response to the total DAI existing in downlink control information (DCI) scheduling the last DL transmission of the at least one DL transmission.

5. The method of claim 3, wherein the DAI is a counter DAI in response to a total DAI not existing in downlink control information (DCI) scheduling the last DL transmission of the at least one DL transmission.

6. The method of claim 2, wherein the CG-UCI indicates a least significant bit (LSB) of a downlink assignment index (DAI) of a last DL transmission of the at least one DL transmission.

7. The method of claim 1, wherein the CG-UCI and the HARQ-ACK feedback are jointly encoded.

8. The method of claim 7, further comprising:
   determining the first codebook size for the HARQ-ACK codebook comprising the HARQ-ACK feedback based on the received at least one DL transmission.

9. The method of claim 1, wherein the set of HARQ-ACK codebook sizes is configured by a radio resource control (RRC) message or the set of HARQ-ACK codebook sizes is predefined.

10. The method of claim 1, wherein negative acknowledgement (NACK) bits are included in the HARQ-ACK codebook as padding bits to align the second codebook size.

11. The method of claim 10, wherein a number of padding bits is equal to the second codebook size minus the first codebook size.

12. A base station, comprising:
    at least one memory; and
    at least one processor coupled with the at least one memory and configured to cause the base station to:
    transmit, to a user equipment (UE), a first number of downlink (DL) transmissions with corresponding hybrid automatic repeat request acknowledgement (HARQ-ACK) feedback to be transmitted in a physical uplink control channel (PUCCH) in a slot;
    determine that the PUCCH overlaps with a physical uplink shared channel (PUSCH), wherein the PUSCH is configured to be transmitted by the UE in the slot; and
    receive, from the UE, the PUSCH in the slot, wherein configured grant uplink control information (CG- UCI) associated with the PUSCH and the HARQ-ACK feedback are multiplexed on the PUSCH, wherein a HARQ-ACK codebook is generated based on a first codebook size in response to the first codebook size being included in a set of HARQ-ACK codebook sizes, and the HARQ-ACK codebook is generated based on a second codebook size in response to the first codebook size not being included in the set of HARQ-ACK codebook sizes, wherein the second codebook size is a minimum codebook size in the set of HARQ-ACK codebook sizes which is larger than the first codebook size.

13. The base station of claim 12, wherein the CG-UCI and the HARQ-ACK feedback are separately encoded.

14. The base station of claim 13, wherein the CG-UCI indicates a downlink assignment index (DAI) latest received by the UE among the first number of DL transmissions.

15. The base station of claim 14, wherein the DAI is a total DAI in response to the total DAI existing in downlink control information (DCI) latest received by the UE for scheduling the first number of DL transmissions.

16. The base station of claim 14, wherein the DAI is a counter DAI in response to a total DAI not existing in downlink control information (DCI) latest received by the UE for scheduling the first number of DL transmissions.

17. The base station of claim 13, wherein the CG-UCI indicates a least significant bit (LSB) of a downlink assignment index (DAI) latest received by the UE among the first number of DL transmissions.

18. The base station of claim 12, wherein the CG-UCI and the HARQ-ACK feedback are jointly encoded.

19. A user equipment (UE), comprising:
at least one memory; and
at least one processor coupled with the at least one memory and configured to cause the UE to:
receive, from a base station, at least one downlink (DL) transmission with corresponding hybrid automatic repeat request acknowledgement (HARQ-ACK) feedback to be transmitted in a physical uplink control channel (PUCCH) in a slot;
determine that the PUCCH overlaps with a physical uplink shared channel (PUSCH), wherein the PUSCH is configured to be transmitted by the UE in the slot;
transmit, to the base station BS, the PUSCH in the slot, wherein configured grant uplink control information (CG-UCI) associated with the PUSCH and the HARQ-ACK feedback are multiplexed on the PUSCH;
generate a HARQ-ACK codebook based on a first codebook size in response to the first codebook size being included in a set of HARQ-ACK codebook sizes; and
generate the HARQ-ACK codebook based on a second codebook size in response to the first codebook size not being included in the set of HARQ-ACK codebook sizes, wherein the second codebook size is a minimum codebook size in the set of HARQ-ACK codebook sizes which is larger than the first codebook size.

20. A processor for wireless communication, comprising:
at least one hardware controller coupled with at least one memory and configured to cause the processor to:
receive, from a base station, at least one downlink (DL) transmission with corresponding hybrid automatic repeat request acknowledgement (HARQ-ACK) feedback to be transmitted in a physical uplink control channel (PUCCH) in a slot;
determine that the PUCCH overlaps with a physical uplink shared channel (PUSCH), wherein the PUSCH is configured to be transmitted by the processor in the slot;
transmit, to the base station, the PUSCH in the slot, wherein configured grant uplink control information (CG-UCI) associated with the PUSCH and the HARQ-ACK feedback are multiplexed on the PUSCH;
generate a HARQ-ACK codebook based on a first codebook size in response to the first codebook size being included in a set of HARQ-ACK codebook sizes; and
generate the HARQ-ACK codebook based on a second codebook size in response to the first codebook size not being included in the set of HARQ-ACK codebook sizes, wherein the second codebook size is a minimum codebook size in the set of HARQ-ACK codebook sizes which is larger than the first codebook size.

* * * * *